(12) United States Patent
Hill et al.

(10) Patent No.: US 6,606,637 B1
(45) Date of Patent: Aug. 12, 2003

(54) SYSTEM AND METHOD FOR UNIFIED DATA ACCESS OF FINANCIAL DATA

(75) Inventors: Martin Hill, Hook Hampshire (GB); John Merrick, Aurora, IL (US); Tong-Liang Zhang, Bloomingdale, IL (US); Vladimir Vints, Chicago, IL (US)

(73) Assignee: Reuters America, Inc., New York, NY (US)

( * ) Notice: Subject to any disclaimer, the term of this patent is extended or adjusted under 35 U.S.C. 154(b) by 184 days.

(21) Appl. No.: 09/629,665

(22) Filed: Aug. 1, 2000

(51) Int. Cl.[7] ............................. G06F 7/00; G06F 17/15
(52) U.S. Cl. .................................................. 707/104.1
(58) Field of Search ................................. 707/1, 104.1

(56) References Cited

U.S. PATENT DOCUMENTS 5,546,455 A * 8/1996 Joyce et al. ................ 379/111
5,696,925 A * 12/1997 Koh .......................... 711/202
5,740,053 A * 4/1998 Iwama ....................... 118/52
6,173,289 B1 * 1/2001 Sonderegger et al. ....... 345/764

OTHER PUBLICATIONS

Exemplary pages from the website "www.MICROSOFT.COM" concerning the OLE DB system (as of Jun. 1, 2000).

* cited by examiner

Primary Examiner—Jack M. Choules
(74) Attorney, Agent, or Firm—Banner & Witcoff, Ltd.

(57) ABSTRACT

A system for accessing financial data that is suitable for data of different formats from disparate sources. Real-time financial information or data is stored and arranged in a data model with table and column schema in a standard suitable for use with an OLE DB provider programmed to access financial information. Accordingly, different types of financial information from disparate sources may be integrated and readily accessed. Specifically, the present invention is directed to a real-time OLE DB provider data model that is divided into different tables categorized into records, pages, time series and context information.

27 Claims, 5 Drawing Sheets

| CONTEXT |
|---|
| HOST_LIST |
| PORT_NUMBER |
| USER_NAME |
| MOUNT_WAIT_TIME |
| CONNECTED_HOST |
| FID_DB_KEY |
| APPENDIX_A_NAME |
| ENUMDEF_NAME |
| DEFAULT_RECORD_SERVICE |
| DEFAULT_TIME_SERIES_SERVICES |
| DATA_SOURCE |
| DEFAULT_PAGE_SERVICE |

Fig. 1D

SYSTEM AND METHOD FOR UNIFIED DATA ACCESS OF FINANCIAL DATA

FIELD OF THE INVENTION

The present invention relates to a method and system for real-time access of data and in particular to real-time access of financial data from disparate data sources.

DESCRIPTION OF RELATED ART

Real-time access to information is a primary focus of technological development in commercial activity today. A wide range of different data storage formatting environments are available to store information. With the abundant amount of information available, it is becoming increasingly important to be able to bridge these diverse environments and integrate data from disparate data sources, regardless of data type.

Database software technology is currently being developed to enable common data access from diverse formatted data sources, irrespective of data type. Universal Data Access (UDA) is a software technology developed by Microsoft for accessing data. An Object Linking and Embedding database (OLE DB) specification is the underlying programming model for accessing multi-dimensional data through a Component Object Model (COM). Specifically, the OLE DB defines a set of COM interfaces that permit uniform access to data stored in diverse sources, regardless of location or type. Thus, the OLE DB application program interface (API) is a flexible and efficient means for achieving universal data integration and accessability.

The basic concept of the OLE DB specification is to arrange data in a standard, tabular form comprising rows and columns. The OLE DB specification is described in *Microsoft OLE DB 2.0 Programmer's Reference and Data Access SDK*, Microsoft Press, (1999), and is hereby incorporated by reference.

It is therefore desirable to implement the OLE DB technology for real-time accessing of financial data from disparate data sources.

SUMMARY OF THE INVENTION

An object of the present invention is develop a method and system for accessing financial data that is suitable for data of different formats from disparate sources.

In accordance with the present invention, real-time financial information or data is stored and arranged in a data model with table and column schema in a standard suitable for use with an OLE DB provider programmed to access financial information. Accordingly, different types of financial information from disparate sources may be integrated and readily accessed. Specifically, the present invention is directed to a real-time OLE DB provider data model that is divided into different tables categorized into records, pages, time series and context information.

One aspect of the present is directed to a data model for providing real-time access to financial information using an Object Linking and Embedding database provider, wherein the data model includes a real-time record table, a time series table, a page table, and/or a context table.

BRIEF DESCRIPTION OF THE DRAWINGS

The foregoing and other features of the present invention will be more readily apparent from the following detailed description and drawings of illustrative embodiments of the invention wherein like reference numbers refer to similar elements throughout the several views and in which.

DETAILED DESCRIPTION OF THE INVENTION

For the purposes of the description of the system in accordance with the present invention the title or name used to identify a particular table is written in capital letters, whereas the title or name used to identify a particular attribute or column within a table is denoted by quotations with the first letter of each word capitalized. The names and titles associated with the tables, attributes, row and columns have no impact on the scope of the invention.

In accordance with the present invention, real-time financial information or data is stored and arranged in a data model with table and column schema in a standard suitable for use with an OLE DB provider. Accordingly, different types of financial data from disparate sources may be integrated and readily accessed.

Figure 1A:
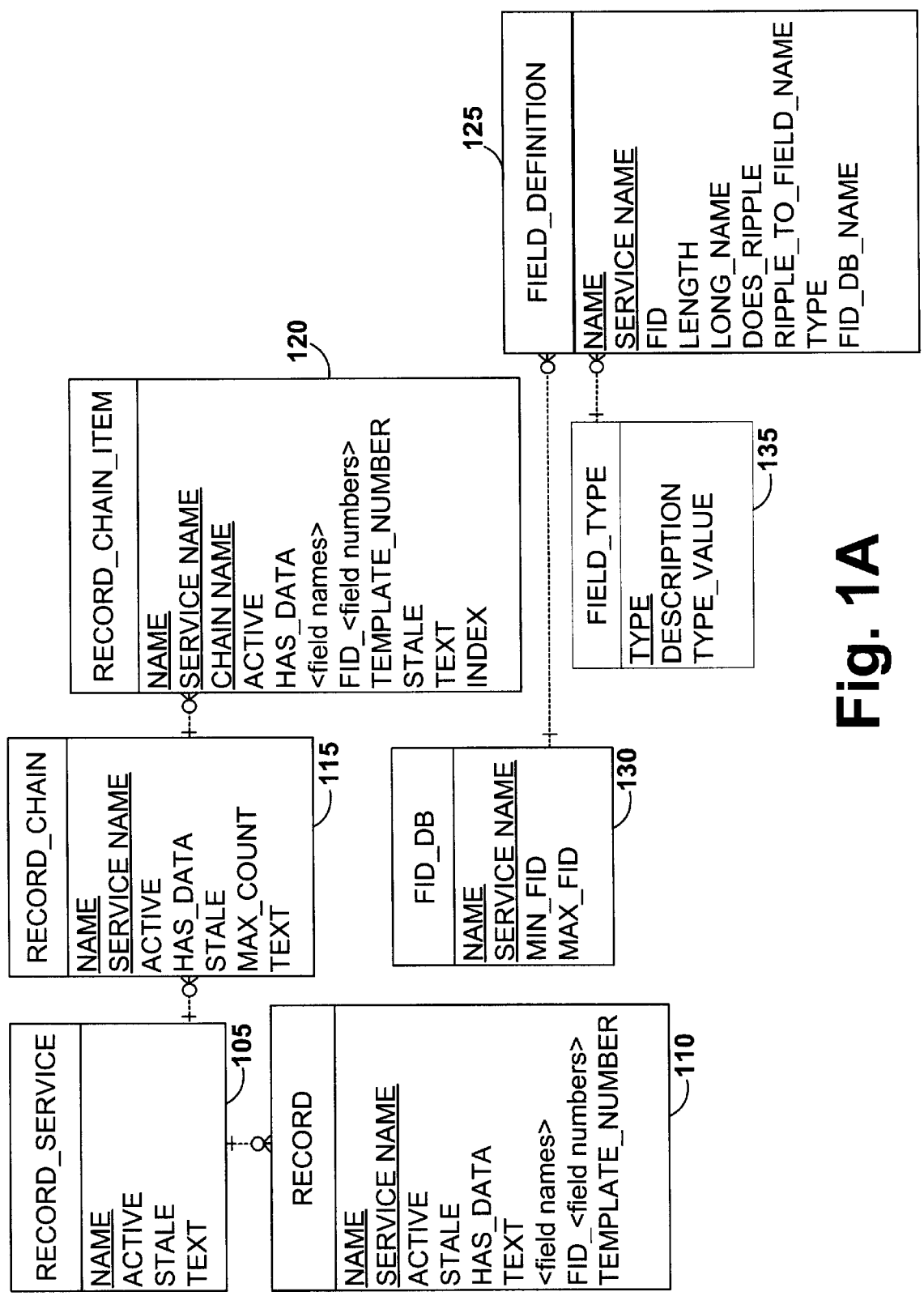
FIG. 1 is an exemplary data model structure for real-time access of financial data in accordance with the present invention.
Figure 1B:
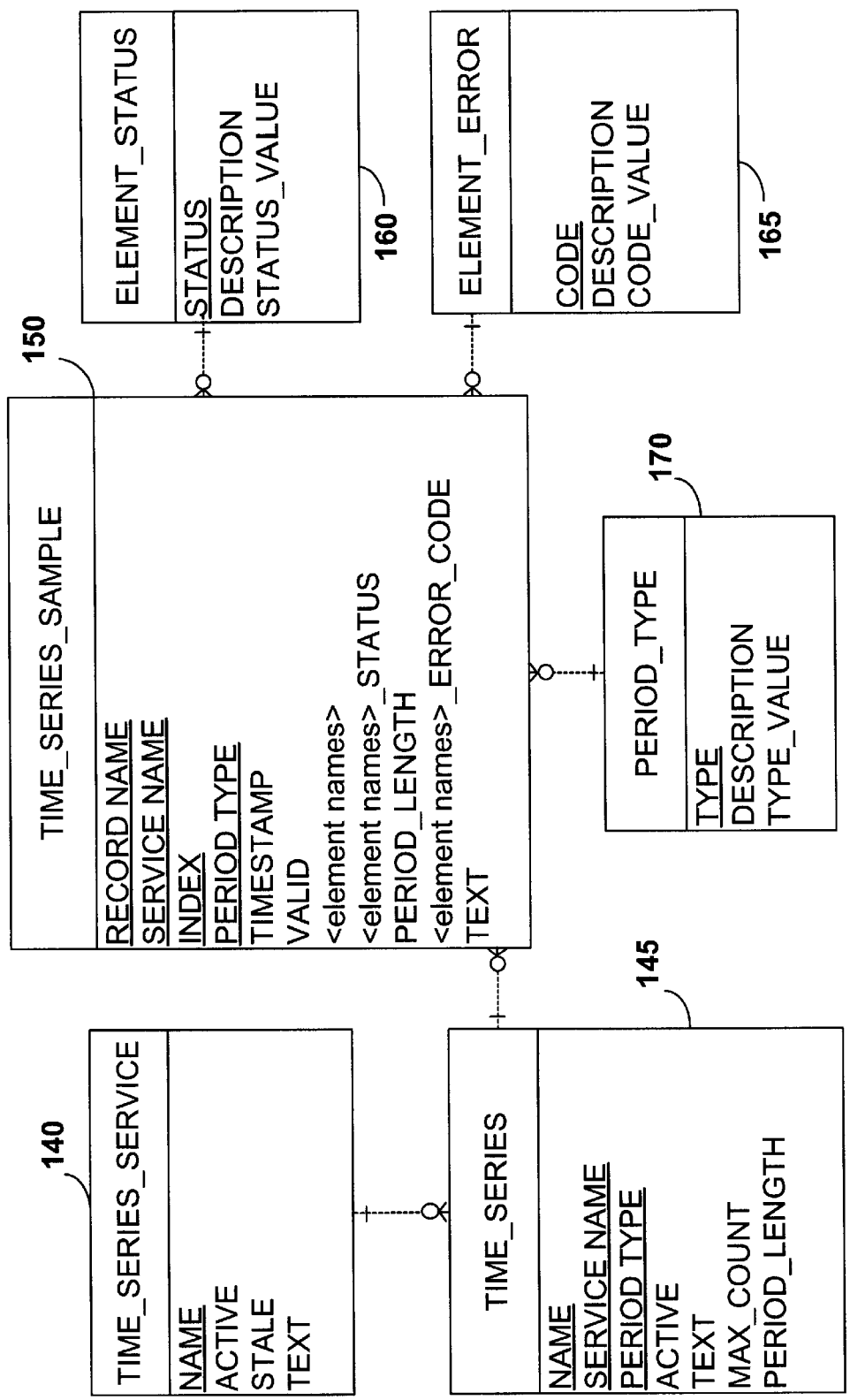
Figure 1C:
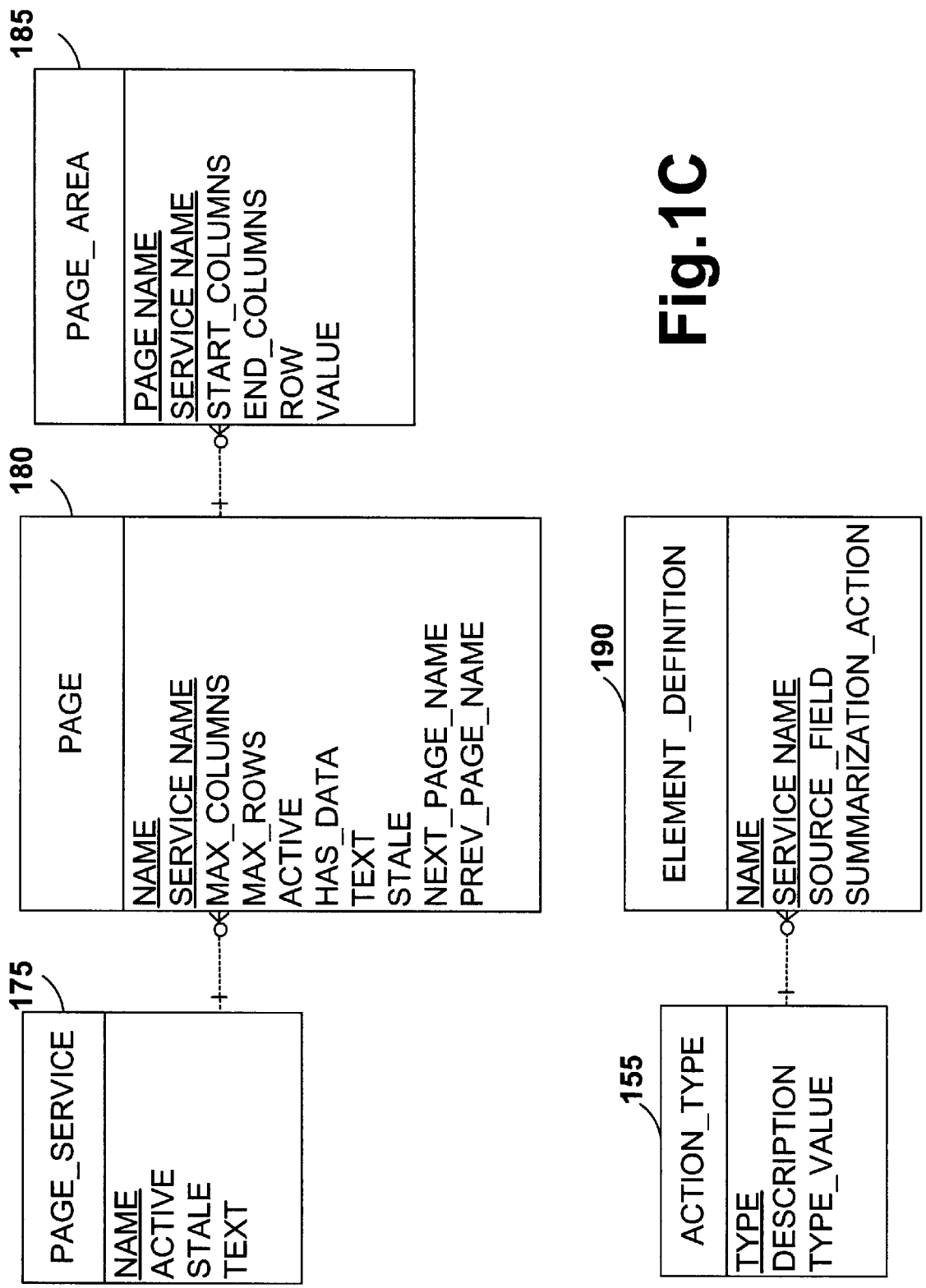
Figure 2:
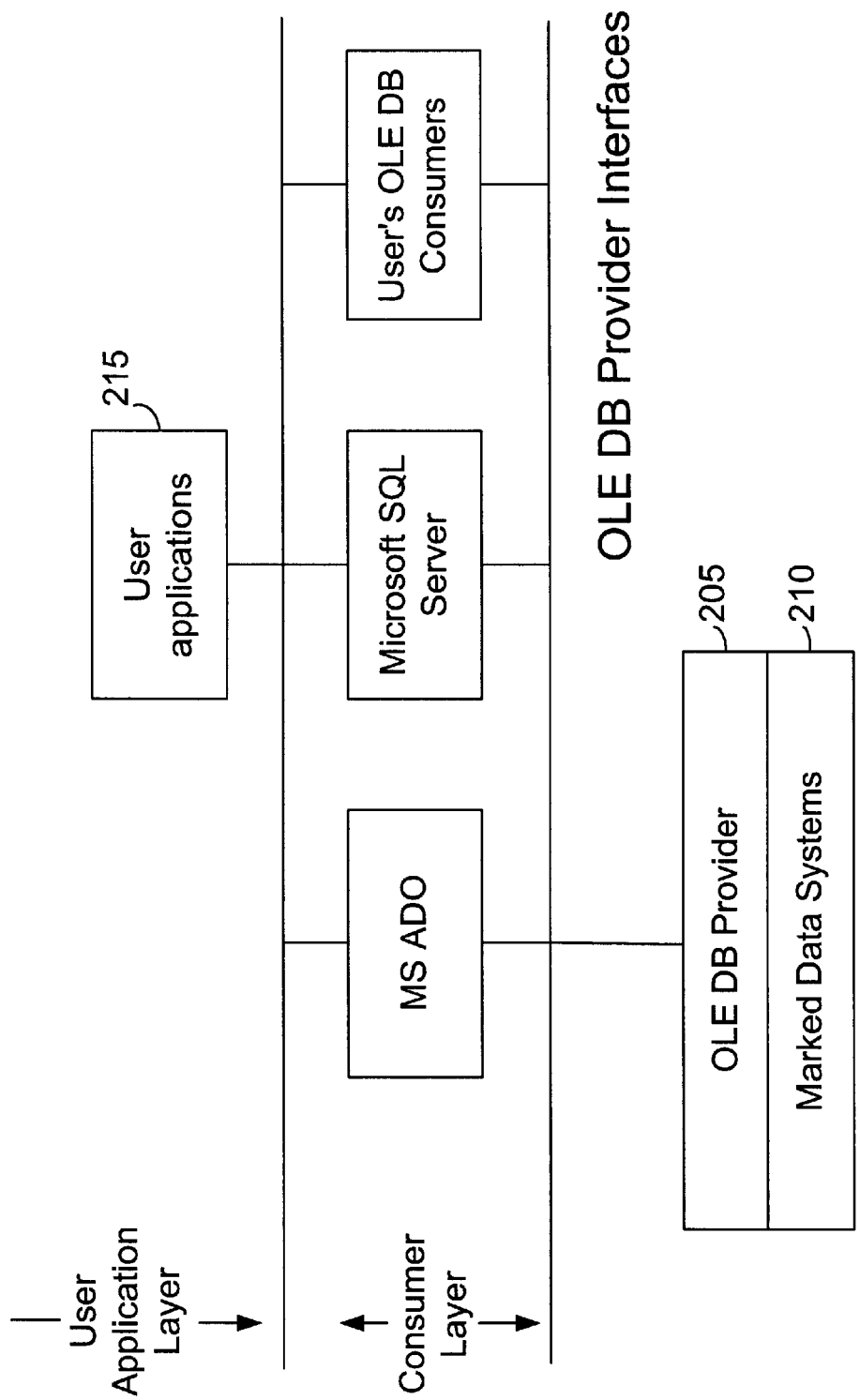
FIG. 2 is a high level diagram of the system used to run the data model structure of FIG. 1.

FIG. 2 is a high-level diagram of the system including the OLE DB provider data model in accordance with the present invention. An OLE DB provider 205 is programmed specifically to access financial market data and includes the data model structure shown in FIG. 1 and discussed in detail below. The financial market data OLE DB provider utilizes a Market Data System 210 used to access various sources of financial market data. User applications 215 access the financial market data via standard OLE DB provider programming interfaces developed by Microsoft and the specific financial market data OLE DB provider in accordance with the present invention. The standard forms of OLE DB provider access are through Microsoft ADO, Microsoft SQL Server, and third party and user developed OLE DB Consumers.

An exemplary data model for storage of financial information or data in accordance with the present invention is shown in FIG. 1. By way of example, the data model is divided into 19 tables. It is however, within the intended scope of the present invention to use any number of tables, as desired. In the exemplary embodiment in FIG. 1, the tables of the data model are arranged or categorized into one of four different groups. In a preferred embodiment, the tables of the data model are classified or categorized into respective groups based on the information, such as real-time record, time series, page, and context, stored therein. One of ordinary skill would be able to modify the data model to include more or less than four groups.

Tables are OLE DB provider objects that contain all the data available through the provider. A table is defined by a set or collection of columns. Data in each table is arranged in a row-and-column format similar to that of a spreadsheet, wherein each column is representative of an attribute of the table and each row represents a unique data item associated therewith.

In FIG. 1, the relationships between the tables in the data model are illustrated by dotted lines terminating in either an addition symbol ("+") or an open circle ("○") with multiple spokes. The addition symbol represents a single item from a table, whereas the open circle represents multiple items from a table. Thus, symbols may be used to denote a one-to-many relationship or a one-to-one relationship between any two tables in the data model. By way of example, in FIG. 1 a one-to-many relationship exists between RECORD SERVICE table 105 and RECORD table 110. A plurality of records may therefore be associated with each record service.

Each group of tables in FIG. 1 will now be described in detail. The Real-Time Record group of tables associated with real-time record information includes RECORD SERVICE, RECORD, RECORD CHAIN, RECORD CHAIN ITEM, FIELD DEFINITION, FID DB, and FIELD TYPE tables. Table I below summarizes the real-time record column attributes and data type for each table in the Real-Time Record group.

TABLE I

REAL-TIME RECORD COLUMNS

| Column Name | Column Type | Column Description | Description/ Comments |
|---|---|---|---|
| RECORD SERVICE | | | |
| NAME | String | Service Name | Name of the record service. |
| ACTIVE | Boolean | Service Active Flag | True when the record service is active, false otherwise. |
| STALE | Boolean | Service Stale Flag | False when the record service is able to send market data to its clients, true otherwise. Usually, STALE is true when there is a failure on the network. |
| TEXT | Boolean | Service Status Text | Description of the current diagnostic state of the service. |
| RECORD | | | |
| NAME | String | Record Name | Name of the record. |
| SERVICE NAME | Boolean | Service Name | Name of the service from which the record was requested. |
| ACTIVE | Boolean | Record Active Flag | True if the record is active, i.e., the service accepted the request and is expected to provide data for the record. False if the request was denied, for example, if the user was not authorized to receive data for the record. |
| STALE | Boolean | Record Stale Flag | False when the record has valid up-to-date data, true otherwise. |
| HAS DATA | Boolean | Record has Data Flag | True when the record has data, false otherwise. |
| TEXT | String | Record Status Text | Description of the current state of the record. Provides additional diagnostic information. |
| TEMPLATE NUMBER | String | Record Template Number | Record template number, provided by the record service, is a grouping factor for the records with the same set of fields. |
| <field name> | <data type> | <field long name> | This column allows access to market data fields by name. The data type and field long name are determined by the field definition. |
| FID <field number> | <data type> | <filed long number> | This column allows access to market data fields by field number. The data type and field long name are determined by the field definition. |
| RECORD CHAIN | | | |
| NAME | String | Record Chain Name | Name of the record chain. |
| SERVICE NAME | String | Service Name | Name of the service from which the record chain was requested. |
| ACTIVE | Boolean | Chain Active Flag | True if the chain is active, i.e., the service accepted the request and is expected to provide data for the chain. False if the request was denied, for example, if the user was not authorized to receive data for the record chain. |
| HAS DATA | Boolean | Chain Has Data Flag | True if the record chain has data, false otherwise. |
| STALE | Boolean | Chain Stale Flag | False when the record chain has valid up-to-date data, true otherwise. |

TABLE I-continued

REAL-TIME RECORD COLUMNS

| Column Name | Column Type | Column Description | Description/ Comments |
|---|---|---|---|
| MAX COUNT | Long Integer | Number of Chain Records | Number of items comprising the chain. |
| TEXT | String | Chain Status Text | Description of the current status of the record chain. Provides additional diagnostic information. |
| RECORD CHAIN ITEM | | | |
| NAME | String | Record Item Name | The record chain items are records comprising the record chain. Name of the record chain item is name of the corresponding record. |
| SERVICE NAME | String | Service Name | Name of the record service the item is requested from. |
| CHAIN NAME | String | Record Chain Name | Name of the record chain that contains the item. |
| ACTIVE | Boolean | Record Active Flag | True if the item is active, i.e., the service accepted the request for this item, false otherwise. |
| INDEX | Long Integer | Record Chain Item Index | Index of the item in the chain. |
| HAS DATA | Boolean | Record Has Data Flag | True if the item has data, false otherwise. |
| STALE | Boolean | Record State Flag | False when the record chain item has valid up-to-date data, true otherwise. |
| TEXT | String | Record Status Text | Description of the current status of the record chain. Provides additional diagnostic information. |
| TEMPLATE NUMBER | String | Record Template Number | Similar to TEMPLATE NUMBER in the RECORD table. Record chain items with the same set of fields will have the same template number, if supported by the record service. |
| <field name> | <data type> | <field long name> | This column allows access to market data fields by name. The data type and field long name are determined by the field definition. |
| <field number> | <data type> | <field long number> | This column allows access to market data fields by number. The data type is determined by the field definition. |
| FIELD DEFINITION | | | |
| NAME | String | Field Name | Name of the field. |
| SERVICE NAME | String | Service Name | Name of the record service that provided the field definition database. |
| FID | Integer | FID | Number of the field. |
| LENGTH | Integer | Field Name Length | Size of the field. |
| LONG NAME | String | Field Description | Description of the field. |
| DOES RIPPLE | Boolean | Field Does Ripple Flag | True if this field "ripples", false otherwise. See the RIPPLE TO FIELD NAME below for more information on "ripple-to" fields. |
| RIPPLE TO FIELD NAME | String | Ripple to Field Name | Name of the field that the current field "ripples" to. "Ripple" means here that after update has been received for the current field, its previous value will be assigned to the "ripple-to" field. |
| TYPE | String | Field Type | Type of the field from the field type table. |
| FID DB NAME | String | FID DB Name | Name of the field definition database, if available. |
| FID DB | | | |
| SERVICE | String | Service Name | Name of the record service that |

TABLE I-continued

REAL-TIME RECORD COLUMNS

| Column Name | Column Type | Column Description | Description/ Comments |
|---|---|---|---|
| NAME | | | provided the field definition database. |
| NAME | String | FID DB NAME | Name of the field definition database (FID DB), if available. |
| MIN FID | Integer | Min FID | The lowest field number in the FID DB. |
| MAX FID | Integer | Max FID | The highest field number in the FID DB. |
| FIELD TYPE | | | |
| TYPE | String | Field Type | Type of the field as a string. |
| DE-SCRIP-TION | String | Field Type Descriptive Name | Descriptive name of the field type. |
| TYPE VALUE | Integer | Field Type Value | Enumerated value of the field type. |

In Table 1, RECORD SERVICE table 105 includes the "Name" and associated attributes of a particular record service or source of financial information. Attributes identified with each service or source of financial information include whether the service is "Active" and/or "Stale". A particular record service is stale when it is unable to send market data to its clients, for example, due to a network failure. Thus, the record service may be active but unable to send information due to a network failure. The "Active" and "Stale" attributes are represented in boolean form. "Text" is an attribute that provides additional information concerning the current diagnostic state of the record service, such as, "trying to connect", "ready" or "unavailable".

Each record service or source of financial information contains one or more data records. As shown in FIG. 1, this one-to-many relationship is depicted by the dotted line connecting RECORD SERVICE table 105 and RECORD table 110. RECORD table 110 includes information concerning each record, such as the name of each record ("Name") and the name of the record service("Service Name") from which the record was requested. The RECORD table also includes "Active" and "Stale" attributes. A record service is active if the service accepted the request. The record service is not active and the request will therefore be denied if the user that issued the request is not authorized to receive data for the requested record. The record service is stale when the record does not have valid up-to-date data. Other attributes of RECORD table 110 includes "Has Data" which indicates whether the record has any data, "Text" that provides additional information concerning the current diagnostic state of the record, "Template Number" which is a unique number assigned by the record service as a grouping factor for records with the same set of fields. The <field name> and <field number> attributes allow access to market data fields by field name and field number, respectively. The field name and number are determined by the field definition.

Multiple records may be grouped into a record chain, wherein each record in the chain is referred to as a record chain item. The name of each record chain, name of the record service from which the records in the record chain were requested are identified in RECORD CHAIN table 115 as attributes "Name" and "Service Name", respectively. Other associated real-time attributes are identified in RECORD CHAIN table 115 include "Active" which is true if the service has accepted the request. Otherwise, the flag is not active if the request is denied, for example, when a user is not authorized to receive data for the record chain. The "Has Data" attribute is a boolean value used to indicate whether the record chain has data, while the "Stale" attribute identifies whether the record chain has valid up-to-date data. Since the record chain comprises multiple records, the RECORD CHAIN table includes a "Max Count" attribute, which is an integer value of the number of items comprising the record chain. Lastly, the "text" attribute is a string variable that provides additional information concerning the current diagnostic status of the record chain.

RECORD CHAIN ITEM table 120 in FIG. 1 stores each record item in a given record chain. Thus, RECORD CHAIN table 115 is distinguishable from that of the RECORD CHAIN ITEM table 120 in that the former provides real-time access to the record chain as a whole, while the latter provides real-time access to the individual items or records comprising a record chain. In the example shown in FIG. 1, the record attributes of the chain as a whole and those attributes of the individual elements of the chain are divided into two separate tables, but these could alternatively be integrated into a single table. Referring to Table 1, the information stored in RECORD CHAIN ITEM table 120 includes the name of each record chain item ("Name"), the name of the record service from which the record item was requested ("Service Name"), and the name of the record chain that contains the record chain item ("Chain Name"). Other attributes include an "Active" flag which is active if the service accepted the request, "Index" is a unique non-negative integer value indexing the item in the record chain, "Has Data" is a boolean value that indicates whether the item has data, "Stale" is a boolean value that represents whether the item has valid up-to-date values; "Text" is a descriptive data string that provides additional information concerning the current diagnostic status of the record chain; the "Template Number" attribute represents a unique number provided by the record service and used to identify records with the same set of fields. The "<field name>" and "<field number>" attributes allow access to market data fields by field name and field number, respectively. The field name and number are determined by the field definition. Field names may vary for different services and records.

The remaining tables in the Real Time Record Group, namely FIELD DEFINITION, FID DB, and FIELD TYPE, all relate to a field information. Each record comprises one or more fields. Field names and their type, such as Time with seconds, Integer, Numeric, Date, Price, Alphanumeric, Enumerated, Time, Binary, and Long Alphanumeric, are maintained in a FIELD DEFINITION table 125. A set of field definitions are grouped together as a Field Definition Database (FID DB) table 130.

The FIELD DEFINITION table 125 includes such attributes as the name of the field ("Name"), the name of the record service that provided the field definition database ("Service Name"), the number of the field ("FID"), the size of the field ("Length"), and a description of the field ("Long Name"). The "Ripple To Field Name" attribute is a data string identifying the name of the field that the current field "ripples". After an update has been received for the current field its previous value is assigned to the "ripple to" field. Additional attributes defining the FIELD DEFINITION table include the field type ("Type") and the name of the field definition database ("Field Db Name"), if available.

The Field Definition database (FID DB) table 130 includes such attributes as the name of the field definition database ("Name"), the name of the record service that provided the field definition database ("Service Name"), the lowest field number in the field definition database ("Min FID") and the highest field number in the field definition database ("Max FID").

The last table in the Real Time Record Group is FIELD TYPE 135. Attributes associated with the FIELD TYPE table include "Type", which is an integer value representing the type of field. For example, the field type may be one of: Time with seconds, Integer, Numeric, Date, Price, Alphanumeric, Enumerated, Time, Binary, Long Alphanumeric. Other attributes specified include a descriptive name of the field type ("Description") and a "Type Value" which is an integer value corresponding to a selected field type. By way of example, "0" may be assigned for Time with seconds, "1" for Numeric, etc.

In the exemplary data model shown in FIG. 1, the tables in the Time Series Group represent historical data over a predetermined time period, wherein each data record is a sample. The Time Series Group, in the exemplary data model shown in FIG. 1, includes TIME SERIES SERVICE 140, TIME SERIES 145, TIME SERIES SAMPLE 150, ACTION TYPE 155, ELEMENT STATUS 160, ELEMENT ERROR 165, ELEMENT DEFINITION 190 and PERIOD TYPE 170. Table II below summarizes the time series record column attributes and data type for the Time Series Group.

TABLE II

TIME-SERIES COLUMNS

| Column Name | Column Type | Column Description | Description/ Comments |
|---|---|---|---|
| TIME SERIES SERVICE | | | |
| NAME | String | Service Name | Name of the time series service. |
| ACTIVE | Boolean | Service Active Flag | True when the time series service is active, false otherwise. |
| STALE | Boolean | Service Stale Flag | False when the time series service is able to send market data to its clients, true otherwise. Usually, STALE is true when there is a failure on the network. |
| TEXT | String | Service Status Text | Description of the current state of the service. Provides additional diagnostic information. |
| TIME SERIES | | | |
| NAME | String | Time Series Record Name | Name of the item for which time series is requested. Item name is the same as record name in the RECORD and RECORD CHAIN item tables. |
| SERVICE NAME | String | Service Name | Name of the time series service that is used to provide time series data. |
| ACTIVE | Boolean | Time Series Active Flag | True if the time series service accepts the request for the time-series, false otherwise. |
| COMPLETE | Boolean | Time Series Complete Flag | True if the time series service successfully finished the time series data request. |
| PERIOD LENGTH | Integer | Time Series Period Length | Duration of the requested period. |
| PERIOD TYPE | String | Time Series Period Type | Period type, such as Daily Weekly, Monthly, etc. |
| MAX COUNT | Long Integer | Maximum number of samples | Maximum number of samples available for this item from the time series service. |
| TEXT | String | Time Series Status Text | Description of the current state of the time of the time series service. Provides additional diagnostic information. |
| TIME SERIES SAMPLE | | | |
| RECORD NAME | String | Time Series Record Name | Name of the item for which the time series is requested. |
| SERVICE NAME | String | Service Name | Name of the time series service for which the time series is requested. |
| INDEX | Long Integer | Time Series Sample Index | Index of the time series sample. |
| TIMESTAMP | Time Stamp | Time Series Sample TimesStamp | Time stamp of the time series sample. |
| PERIOD LENGTH | Integer | Time Series Period Length | Length of the period in days for the requested time series |
| PERIOD TYPE | Integer | Time Series Period Type | Type of the time series period, such as Daily, Weekly, Monthly, etc. |
| VALID | Boolean | Time Series Sample Valid Flag | True if the sample is valid, false otherwise. The sample is invalid if the data was unavailable or corrupted for the sample. |
| TEXT | String | Time Series Sample Text | Description of the current state of the time series sample. Provides additional diagnostic information. |
| <element name> | String | <element name> | Name of the time series element. Valid element names are determined after the time series is received. |
| <element name> STATUS | String | <element name> Status | Status of the element. The name of the column is combined from element name (see above) and the string "STATUS". The ELEMENT STATUS table contains supported elements status. |
| <element name> ERROR CODE | String | <element name> Error Code | Error code, if element had errors. The name of the column is combined from the element name (see above and string "ERROR CODE". The ERROR CODE table contains supported error codes. |
| ACTION TYPE | | | |
| TYPE | String | Summarization Action Type Code | Summarization action type specifying the criteria for which the data was summarized, such as, for example, "Sum" or "Average". |
| DESCRIPTION | String | Summarization Action Type Description | Description of the Summarization action. |
| TYPE VALUE | Integer | Summarization Action Type Value | Enumerated value corresponding to the action type. |

TABLE II-continued

TIME-SERIES COLUMNS

| Column Name | Column Type | Column Description | Description/ Comments |
|---|---|---|---|
| ELEMENT STATUS | | | |
| STATUS | String | Element Status Code | Element status value, such as, for example, "Valid", "Invalid", "Edited", or "Deleted". |
| DESCRIPTION | String | Element Status Description | Description of the element status. |
| STATUS VALUE | Integer | Element Status Value | Numeric Value corresponding to the status. |
| ELEMENT ERROR | | | |
| ERROR | String | Element Error Code | Element error code, such as, for example, "No Activity", "Holiday", etc. |
| DESCRIPTION | String | Element Error Description | Description of the error code. |
| ERROR VALUE | Integer | Element Error Value | Integer error number. |
| ELEMENT DEFINITION | | | |
| NAME | String | Element Name | Name of the element. |
| SERVICE NAME | String | Service Name | Name of the time series service that provided the element definition. |
| SOURCE FIELD | String | Source Field | Name of the field that corresponds to the element. |
| SUMMARIZATION ACTION | String | Summarization Action | Summarization action for the element, such as "Sum" or "Average". The ACTION TYPE table is used to maintain supported summarization actions. |
| PERIOD TYPE | | | |
| TYPE | String | Period Type Code | Period type code, such as "Daily", "Weekly", etc. |
| DESCRIPTION | String | Period Type Description | Description of the period. |
| TYPE VALUE | Integer | Period Type Value | Numeric value of the period type. |

Referring to Table II, the attributes associated with TIME SERIES SERVICE table 140 include the name of the time series service ("Time Series Service Name"), a boolean value indicating whether the time series service is active ("Active"), a data string parameter ("Stale") used to indicate whether the time series service is stale and therefore is unable to send market data to its clients, e.g. during a failure on the network, and a description of additional information concerning the current diagnostic state of the time series service ("Text").

TIME SERIES table 145 attributes include the name of the item ("Name") for which time series is requested and the name of the time series service ("Service Name") that provided the time series data. The item name is the same as the record name in the RECORD and RECORD CHAIN ITEM tables, described above. An "Active" flag is used to indicate whether the time series service has accepted the request for the time series data. Additional attributes used to define the TIME SERIES table include "Complete" which indicates whether the time series service is actively being collated or has completed the time series request, "Period Length" defines the interval between samples, "Period Type" defines the unit for the interval between individual samples, e.g., daily, weekly, monthly. By way of example, "Period Type"=daily and "Period Length"=7 are equivalent to "Period Type"=weekly and "Period Length"=1. A maximum number of samples available for the item from the time series service is identified by the "Max Count" attribute, and the "Text" attribute provides additional information concerning the current diagnostic state of the time series service.

The next table identified in Table II is TIME SERIES SAMPLE 150, which represents individual data samples during a predetermined time period. The column attributes associated therewith include the name of the item for which the time series is requested ("Record Name"), the name of the time series service for which the time series is requested ("Service Name"), an index of the time series sample ("Index"), the time stamp of the time series sample ("Timestamp"), the period as measured in days for the requested time series ("Period Length"), and the type of time series period, e.g., daily, weekly, monthly. A time series sample valid flag ("Valid") is used to identify whether the sample is valid. A sample is invalid if the data is unavailable or corrupted. The TIME SERIES SAMPLE table also has a text attribute ("Text") for providing additional information concerning the current diagnostic state of the time series sample. Three additional attributes are associated with the TIME SERIES SAMPLE that relate to an element of the time series. In particular, "<element name>" identifies the name of the time series element, "<element name> Status" provides the status of each associated element name, e.g., "valid", "invalid", "edited" or "deleted", and "<element name> Error Code" identifies whether the time series element has any errors.

Another table in the time series group is ACTION TYPE 155. The attributes associated with the ACTION TYPE table include a summarization action type ("Type") specifying the criteria for which the data was summarized, e.g., "sum" or "average", a description of the summarization action ("Description"), and a predetermined enumerated value corresponding to a particular action type ("Type Value").

The next table listed in the time series group is ELEMENT STATUS 160 which includes "Status" and "Description" attributes that provide a data string representing the element status, e.g., "valid", "invalid", "edited", or "deleted", and a description of the element status. An integer value corresponding to the status is identified in the "Status Value" attribute column.

Another table in the time series group is ELEMENT ERROR 165 which identifies the element error code ("Error"), e.g. "no activity", "holiday", a description of the error code ("Description"), and an "Error Value" which is a numeric value corresponding to the error code in the "Error Code" attribute column.

ELEMENT DEFINITION 190 includes the name of the element ("Name"), the name of the time series service that provided the element definition ("Service Name"), the name of the field that corresponds to the element ("Source Field"), and summarization action specifying the criteria for which the element was summarized, such as, for example, "Sum" or "Average".

The last table in the time series group is PERIOD TYPE which identifies the period over which the time series samples are collated. The attributes or columns associated with this table include "Type" to identify the particular period type code, e.g., "daily", "weekly", "monthly", a written description of the type of period over which the data is being collated ("Description"), and "Type Value" which is a numeric value corresponding to the period type code in the "Type" attribute column.

The exemplary data model shown in FIG. 1 also includes real-time page tables. Source data is stored as individual pages comprising an array or matrix of characters, e.g., 80×250 characters. Each page is assigned a unique identification number. The Real-Time Page group includes PAGE SERVICE table 170, PAGE table 180, and PAGE AREA table 185, which identify the service from which the page data originates and the number of rows and columns of characters on a page, respectively. Table III below summarizes the page column attributes and data type for the Page Group.

TABLE III

PAGE COLUMNS

| Column Name | Column Type | Column Description | Description/Comments |
|---|---|---|---|
| PAGE SERVICE | | | |
| NAME | String | Service Name | Name of the page service. |
| ACTIVE | Boolean | Service Active Flag | True when the page service is active, false otherwise. |
| STALE | Boolean | Service Stale Flag | False when the page service is able to send market data to its clients, true otherwise. Usually, STALE is true when there is a failure on the network. |
| TEXT | String | Service Status Text | Description of the current state of the service. Provides additional diagnostic information. |
| PAGE | | | |
| NAME | String | Page Name | Name of the real-time page. |
| SERVICE NAME | String | Page Service Name | Name of the service from which the page was requested. |
| MAX COLUMNS | Integer | Maximum Number of Columns | Maximum number of columns on the page, usually 80. |
| MAX ROWS | Integer | Maximum Number of Rows | Maximum number of rows on the page, usually 25. |
| ACTIVE | Boolean | Page Active Flag | True if the page is active, i.e., the service accepted the request for the page and is ready to provide page data, false if the request was rejected, for example, because the user does not have permission to see the page. |
| HAS DATA | Boolean | Page Has Data Flag | True if the page has data, false otherwise. |
| TEXT | String | Page Text | Descriptive status of the page, can be used for verification and diagnostic. |
| STALE | Boolean | Page Stale Flag | False if page data is valid and up-to-date, true otherwise. |
| NEXT PAGE NAME | String | Next Page Name | Name of the next page. |
| PREVIOUS PAGE NAME | String | Previous Page Name | Name of the previous page. |

TABLE III-continued

PAGE COLUMNS

| Column Name | Column Type | Column Description | Description/Comments |
|---|---|---|---|
| PAGE AREA | | | |
| PAGE NAME | String | Page Name | Name of the page from which the area is requested. |
| SERVICE NAME | String | Page Service Name | Name of the respective page service. |
| START COLUMN | Integer | Page Area Start Column | Starting column of the page area. |
| END COLUMN | Integer | Page Area End Column | Ending column of the page area. |
| ROW | Integer | Page Area Row | Row of the page area. |
| VALUE | String | Page Area Text Value | Text contained in the specified are of the page. |

PAGE SERVICE table 175 includes attributes that specify the name of the page service ("Name"), whether the page service is active ("Active"), whether a failure on the network prevents the page service from sending market data to its clients ("Stale"), and a written description of additional information concerning the current diagnostic state of the page service.

A real-time page includes alphanumeric characters. The position of a character on the page is defined by a particular row and column. PAGE table 180 includes such attributes as the name of the real-time page ("Name"), the name of the service from which the real-time page was requested ("Service Name"), the maximum number of columns on the page ("Max Columns"), e.g., 80 columns, the maximum number of rows on the page ("Max Rows"), e.g., 25 rows. Like other tables described above, the PAGE table identifies when the real-time page is active, that is, whether the page service has accepted the request for the page data. A request for page data is rejected and real-time page is inactive, for example, when the user is not authorized to receive the page data. Other attributes provided in the PAGE table include whether the page has data ("Has Data"), a written description of additional information concerning the current diagnostic state of the page ("Text"), whether the page data is valid and up-to-date ("Stale"), and the names of the next and previous pages ("Next Page Name") and ("Previous Page Name"), respectively.

The PAGE AREA table 185 identifies the name of the page from which the information is requested and the name of the associated page service ("Page Name") and ("Page Service"), respectively. In addition, the PAGE AREA table also has several columns associated with defining the page area. Specifically, "Start Column" and "End Column" are integer values used to define the first and last column that bound or define the page area. A particular row from within a particular page area is identified by an integer value in the "Row" attribute, while the associated text located within the specified area of the page is represented by the data string "Value".

Context information is the last grouping in the data model shown in FIG. 1. CONTEXT table 185 provides configuration, mount and diagnostic status information. Table IV below lists the attributes associated with the Context table.

TABLE IV

CONTEXT COLUMNS

| Column Name | Column Type | Column Description | Description/Comments |
|---|---|---|---|
| HOST LIST | String | Host List | List of hosts to try to connect. The hosts are tried in the order they appear in the list. |
| POST NUMBER | Long Integer | Port Number | Port number to connect to. |
| USER NAME | String | User Name | Name of the user, used for authentication purposes. |
| MOUNT WAIT TIME | Long Integer | Mount Wait Time | Timeout, used to established a connection. |
| CONNECTED HOST | String | Connected Host | Name of the currently connected host, in case there is no active connection this column represents the previously connected host name. |
| FID DB KEY | String | FID DB Registry Key | MS-Windows registry key that contains names of the FID DB files. |
| APPENDIX A NAME | String | Appendix A file name | Name and location of Appendix A file. This file is a FID DB file. It contains definitions of fields, their type and lengths. |
| ENUMDEF NAME | String | EnumType.def File Name | EnumType.def file. This file is a FID DB file. It contains extended definitions for the fields of enumerated type. |
| DEFAULT RECORD SERVICE | String | Default Record Service Name | Name of the default record service. This name is used when no service name is specified in a query to one of the tables of the record group. |
| DEFAULT PAGE SERVICE | String | Default Page Service Name | Name of the default page service. This name is used when no service name is specified in a query to one of the tables of the page group. |
| DEFAULT TIME SERIES SERVICE | String | Default Time Series Service Name | Name of the default time series service. This name is used when no service name is specified in a query to one of the tables of the time series group. |

The CONTEXT table, includes an enumerated list of potential hosts ("Host List"). In a preferred embodiment, connection to the hosts are attempted in the order in which they are listed. Also provided in the CONTEXT table is the port number with which to connect ("Port Number"), the name of the user ("User Name") for authentication purposes, and a time period to establish a connection ("Mount Wait Time"). The name of the currently connected host is represented by the "Connected Host" attribute. If no active connection is established, the previously connected host name is identified in this column. Other attributes include a registry key ("FID DB Key") that contains the names of the Field Information Definition Database (FID DB) files. The name and location of an appendix file that contains definitions of fields, their types and lengths is represented as an "Appendix Name" attribute, while the name and location of a definition file that contains extended definitions for the enumerated types of fields is specified in the "Enumdef Name" attribute. Both the appendix and definition files are Field Information Definition Database files. A series of default attributes are also specified in CONTEXT table 185. In particular, the table identifies a default record service name, a page service name and a time series service name to be relied on when no service name is identified in a query to one of the tables of the respective record, page or time series group.

The description of the exemplary embodiment in accordance with the present invention is for illustrative purposes only and is not intended to be limit the scope of the invention. The names used to identify the groups, tables, attributes, rows and columns may be renamed, as desired. Furthermore, the number of groupings, the number of tables in each group and the attributes associated with each table may also be modified, as desired.

The data model in accordance with the present invention in conjunction with the OLE DB specification permits financial data from disparate sources to be integrated, while at the same time providing an inexpensive low-tier data distribution solution and a generic application program interface that can be readily adapted by developers of varying levels of expertise.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. A computer-readable medium having stored thereon a data model for providing real-time access to financial information using an Object Linking and Embedding database provider, comprising;

a real-time record table comprising a record service for a source of financial information, the record service comprising information concerning one or more records each having a record name;

a time series table comprising an item having an item name, the item name being substantially the same as one of the record names;

a page table comprising a service name for the source of financial information; and a context table comprising at least one of the record service, the time series service, and the page service.

2. The computer-readable medium in accordance with claim 1, further comprising a plurality of real-time record tables in a real-time record group.

3. The computer-readable medium in accordance with claim 2, wherein the real-time record group comprises a plurality of tables including information relating to a record service, a record, a chain of records, items in a record chain, a field definition, a field information definition database, and a field type.

4. The computer-readable medium in accordance with claim 1, wherein the time series table includes historical data over a predetermined period of time.

5. The computer-readable medium in accordance with claim 4, further comprising a plurality of time series tables in a time-series group.

6. The computer-readable medium in accordance with claim 5, wherein said time series group comprises a series of tables including information relating to a time series service, times series records, time series samples, action type, element status, element error, element definition, and period type.

7. The computer-readable medium in accordance with claim 1, wherein the page table includes information concerning at least one text page.

8. The computer-readable medium in accordance with claim 7, further comprising a plurality of page tables in a page group.

9. The computer-readable medium in accordance with claim 8, wherein the page group comprises a plurality of tables including information relating to a page service, a page, and a page area.

10. The computer-readable medium in accordance with claim 1, wherein the context table includes configuration and diagnostic information.

11. A computer-readable medium having stored thereon a data model for providing real-time access to financial information using and Object Linking and Embedding database provider, comprising;
   real-time record tables for providing information concerning financial data records, each one of the data records corresponding to a financial information source;
   time series tables for providing information concerning historical data over a predetermined time period for one or more of the financial data records; and
   page tables for providing information for text pages concerning one or more of the financial data records.

12. The computer-readable medium in accordance with claim 11, further comprising a context table for providing configuration and diagnostic information.

13. The computer-readable medium in accordance with claim 11, wherein the financial information is accessible using a Structured Query Language.

14. The computer-readable medium in accordance with claim 13, wherein the Structured Query Language is ANSI SQL-92.

15. The computer-readable medium in accordance with claim 11, wherein the financial information is accessible using ActiveX Data Objects (ADO).

16. A method for accessing financial information comprising:
   receiving financial information from a first financial service; and
   storing the first service financial information on a computer-readable medium having stored thereon a data model, the data model comprising:
      real-time record tables providing information concerning financial data records;
      time series tables providing information concerning historical data over a predetermined time period; and
      page tables providing information concerning text pages.

17. The method in accordance with claim 16, wherein the data model further comprises a context table providing configuration and diagnostic information.

18. The method in accordance with claim 16, further comprising:
   receiving financial information from a second financial service;
   storing the second service financial information on the computer-readable medium in the data model.

19. The method in accordance with claim 16, further comprising providing access to the first service financial information through a programming interface.

20. The method in accordance with claim 19, wherein the programming interface comprises an Object Linking and Embedding database (OLE DB) programming interface.

21. The method in accordance with claim 20, wherein the OLE programming interface comprises one of ActiveX Data Objects (ADO) and Structured Query Language (SQL) programming.

22. The method in accordance with claim 21, wherein the SQL programming comprises ANSI SQL-92.

23. A database provider for accessing financial market data comprising:
   a computer-readable medium; and
   a processor in communication with the computer-readable medium, the processor performing steps according to instructions stored on the computer-readable medium comprising:
      receiving financial information from a first financial service; and
      storing the first service financial information on the computer-readable medium in a data model comprising:
         real-time record tables providing information concerning financial data records;
         time series tables providing information concerning historical data over a predetermined time period; and
         page tables providing information concerning text pages.

24. The database provide in accordance with claim 23, wherein the data model stored on the computer-readable medium further comprises a context table providing configuration and diagnostic information.

25. The database provider in accordance with claim 23, wherein the processor performs further steps comprising:
   receiving financial information from a second financial service; and
   storing the second service financial information on the computer-readable medium in the data model.

26. The database provider in accordance with claim 23, wherein the processor performs further steps comprising providing access to the first service financial information through a programming interface.

27. The database provider in accordance with claim 23, wherein the database provider comprises an Object Linking and Embedding database provider.

* * * * *